United States Patent [19]

Behane et al.

[11] 3,723,646

[45] Mar. 27, 1973

[54] APPARATUS FOR RECONSTRUCTION OF IMAGES

[75] Inventors: David Behane, Yellow Springs; Lewis Harold Spradley, Centerville; Lysle D. Cahill; William W. Marshall, both of Dayton, all of Ohio

[73] Assignee: The Mead Corporation, Dayton, Ohio

[22] Filed: Apr. 5, 1971

[21] Appl. No.: 131,266

Related U.S. Application Data

[62] Division of Ser. No. 803,910, March 3, 1969, Pat. No. 3,604,846.

[52] U.S. Cl...........178/6.6 R, 178/6.6 A, 346/74 ES, 34/75

[51] Int. Cl.............................H04n 1/24, H04n 1/28

[58] Field of Search......178/6.6 R, 6.6 A; 346/74 ES, 346/75, 1

[56] References Cited

UNITED STATES PATENTS

| | | |
|---|---|---|
| 3,588,906 | 6/1971 | Culp et al. ............................346/75 |
| 3,298,030 | 1/1967 | Lewis et al. .......................346/74 ES |
| 3,465,350 | 9/1969 | Keur et al. .........................178/6.6 R |

*Primary Examiner*—James W. Moffitt
*Attorney*—Marechal, Biebel, French & Bugg

[57] ABSTRACT

Code signals for reproduction of original graphic representations are stored in a memory, unloaded, and synchronously processed to control the charging of individual liquid drops which form dots in the proper matrix locations. The print-out is made through control of individual marking drops which are selectively charged and deposited on or diverted from the receiving member according to the code signals. A clock generates synchronizing signals which control the rate and regularity of drop generation, the rate of relative movement between the receiving member and the stream of drops, and the unloading of information signals from the memory and their application to the drop charging apparatus.

5 Claims, 5 Drawing Figures

INVENTORS
DAVID BEHANE,
LEWIS HAROLD SPRADLEY
WILLIAM W. MARSHALL &
BY LYSLE D. CAHILL

Marechal, Biebel, French & Bugg
ATTORNEYS

APPARATUS FOR RECONSTRUCTION OF IMAGES

CROSS REFERENCE TO RELATED APPLICATION

This application is a division of copending application Ser. No. 803,910, filed Mar. 3, 1969, now U. S. Pat. No. 3,604,846, issued Sept. 14, 1971, and assigned to the assignee of the present application.

BACKGROUND OF THE INVENTION

The invention relates to use of an image analyzer, such as disclosed in U. S. Pat. No. 3,307,020, in connection with a novel print-out device. Various proposals have been made, and experimental systems have been tried, using techniques for scanning original photographs, storage and manipulation of the resulting output from the scanner, and subsequent photoreproduction from the manipulated data. However, the contrast of the final print-outs has been only marginally acceptable, and difficulties are encountered in the production of digital information from the scanner, proper correlation and handling of this data, and its adoption to print-out devices having modes of image production different from the scanning techniques employed.

SUMMARY OF THE INVENTION

According to the present invention, an original representation, such as a photographic negative, or film positive, is reduced to a digital record. As described in the parent application, an original is scanned optically and density variations over a small spot are reproduced electronically, converted to digital information, and recorded. The information may then be processed in a computer, the output product being digital information representing a matrix-type scale or variation corresponding to each input "spot", and scaled according to the desired density of that particular incremental area of the print-out.

This output information is stored in a memory device (such as a magnetic tape) and then employed to control a print-out device which merely places marking dots according to the instructions of the output information. The information is unloaded from the memory into a temporary memory from which the information can in turn be supplied synchronously with drop generation and the motion of the drop receiving surface.

The principal object of the invention, therefore, is to provide a novel apparatus for reproduction of graphic information, and in particular to improve the handling of the data, and its use in controlling the charge on individual drops of a high speed drop generator device, whereby a precise high quality print is obtained.

Other objects and advantages of the invention will be apparent from the following description, the accompanying drawings and the appended claims.

DESCRIPTION OF THE PREFERRED EMBODIMENT

Figure 1:
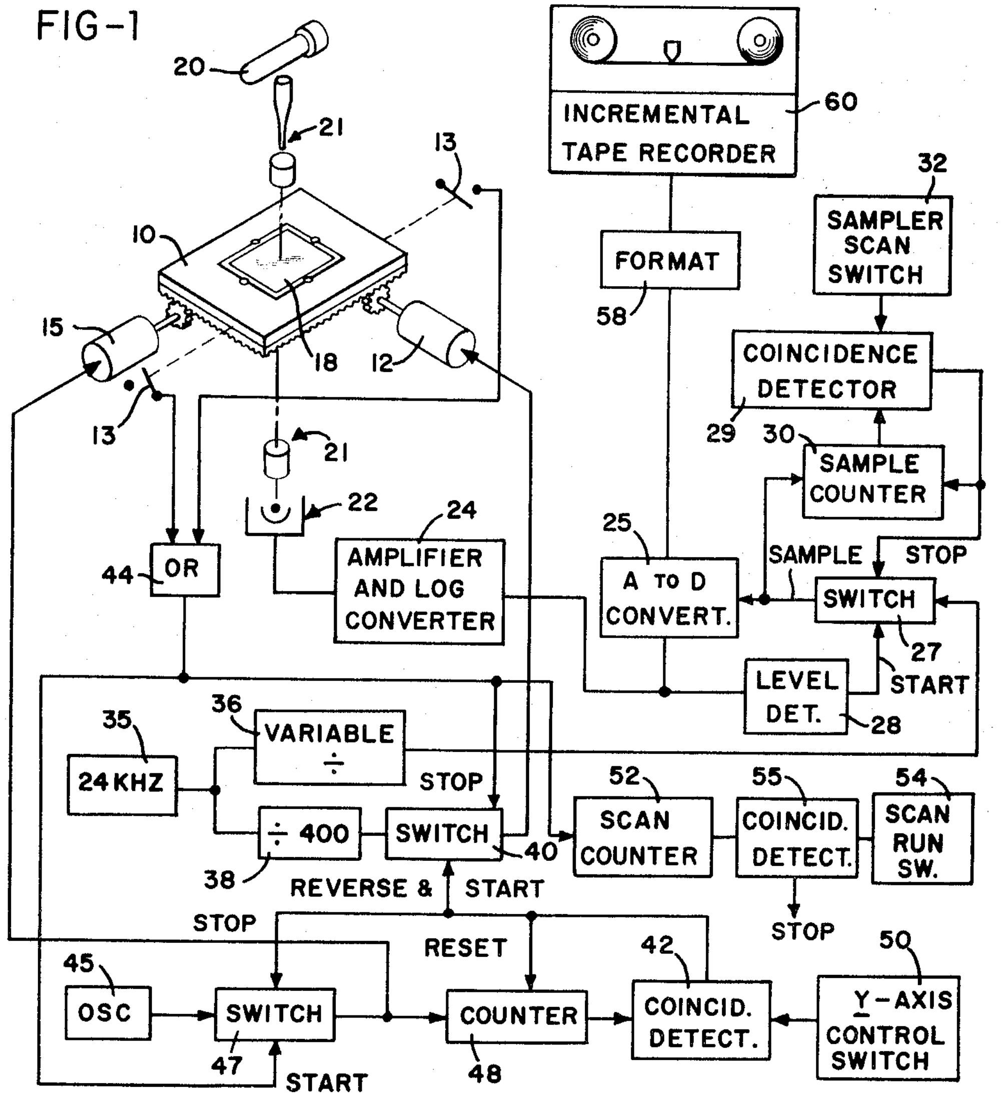
FIG. 1 is a block diagram of the scanning, analyzing, and recording portion of the system.

With reference to FIG. 1, a carriage 10 is suitably supported for scanning movement in the $x$ direction by a motor 12, through a conventional drive connection. Limit switches 13 are mounted so as to be operated respectively when the carriage reaches the desired opposite limits of its $x$ scanning motion. A second motor 15 is arranged to drive the carriage 10 for motion in the $y$ direction. The original representation to be scanned and analyzed is indicated generally at 18. This original may take different forms, such as a positive or negative photographic film, and may for example, be one of a set of color separations.

The image on the original is a gradation of tonal densities which may, for example, appear as portions of greater or lesser optical density. A light source 20 is focused into a scanning light beam of predetermined small cross-sectional dimension through an optical system 21, which includes parts that focus the beam onto a photomultiplier or other suitable light transducer 22. A suitable construction is disclosed in U.S. Pat. No. 3,307,020, entitled HIGH INFORMATION DENSITY DATA RECORD AND READ-OUT DEVICE, and has the capability of producing a scanning spot of light or other radiant energy having a diameter in the order of one micron.

Figure 2:
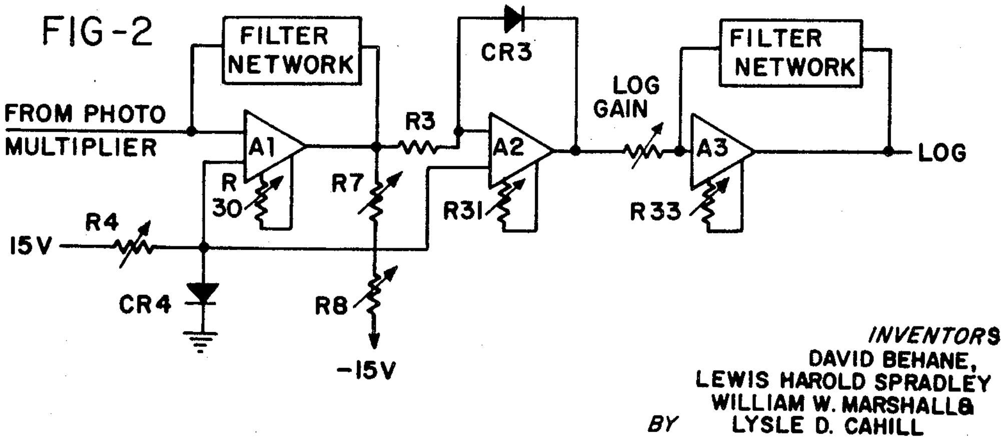
FIG. 2 is a diagram showing details of the amplifier-log converter unit.

The photomultiplier 22 provides an output to an amplifier converter circuit 24, details of which are shown in FIG. 2. Essentially, this circuit embodies a three-stage amplifier, such as the series arranged operational amplifiers A1, A2 and A3. A semi-conductor diode CR3 is connected across the amplifier stage A2, and the voltage across CR3 is proportioned to the log of the current passage through it. The filter networks connected across stages A1 and A3 are provided for noise suppression. The resulting output from this amplifier and converter circuit 24 is a voltage proportional to density on the original 18, an analog signal. It should be recognized that comparable signals obtained from an electronic scanning device can be utilized in the same manner as the derived signal previously described.

The output of circuit 24 is directed to an analog to digital (A to D) converter circuit 25, which is of conventional design, and which converts from the analog input signal to a digital output signal which, in one successful embodiment is a four digit BCD code, for example on a scale of 0 to 5. The converter circuit 25 is arranged for a gated type of operation, and provides digital output signals on a controlled timed basis, under the control of pulses from an electronic switch circuit 27. This switch circuit is turned on by means of a starting signal received from a level detector circuit 28, and the switch circuit 27 is turned off by an output signal from a coincidence detector circuit 29.

For example, a sharply defined starting edge can be provided by a mask positioned along one side of the original 18, at right angles to the direction of $x$ scan. When the sharp edge defined by the mask passes the scanning light beam, the resulting output from the photomultiplier 22 will rise above a predetermined low limit, and this increase in signal output strength through the amplifier circuit 24 will be detected by the detector 28 to turn on the switch circuit 27 and commence operation of the A to D circuit 25. Thus, when on the switch circuit 27 passes sample control pulses to the A to D circuit 25 and effectively gates its operation.

The sample pulses from the switch circuit 27 also are directed to the sample counter 30. The coincidence detector 29 compares the count in counter 30 with a predetermined and known count which is set into the samples per scan switch circuit 32 at the beginning of the operation. This count represents a known and desired number of samples per scan, and in fact divides the *x* scanning operation into small and equal increments. When a coincidence is detected, an output from the detector circuit 29 turns off the switch circuit 27 and also resets the sample counter 30. The sample pulses are derived from a 24 KHz crystal controlled oscillator 35, through a variable divider circuit 36 which provides sample pulses at some predetermined division to the electronic switch circuit 27. In an embodiment actually reduced to practice, a variable divider circuit having a range from 25 Hz to 1 KHz has been used. The same oscillator 35 also feeds pulses to a divider circuit 38 which is arranged to divide by 400, thus providing at its output a stable 60 Hz signal. This signal is fed through an electron switch 40 to the *x*-scan drive control 12. This drive signal to the motor 12 is also directional, in order to control back and forth scanning movement of the carriage 10.

The switch circuit 40 is turned on by an output signal from a coincidence detector circuit 42, and is turned off by an output signal from an OR gate 44. The limit switches 13 each provide inputs to OR gate 44, thus indicating the physical limit of one *x*-scan movement of the carriage in either direction.

A low frequency oscillator 45 (about 10 Hz) provides further control pulses to an electronic switch circuit 47. This switch circuit is turned on by an output from OR gate 44, and is turned off by an output from the coincidence detector 42. When on, the switch circuit 47 passes control pulses from the low frequency oscillator 45 to a counter 48, and also to the *y*-scan drive motor 15.

The *y* increment control switch circuit or register 50 provides a preset count to the detector circuit 42, according to the desired *y* scanning movement between successive *x* scans. It will be appreciated that this *y* scanning movement is relatively small, usually of an order corresponding to the amount of *x* scan movement occurring between successive scanning pulses. When the *Y* scan movement is completed, an output from the coincidence detector 42 resets the counter 48, turns off the electronic switch 47, and transmits a "reverse and start" signal to electronic switch 40, causing the *x* scan drive motor 12 to start in the opposite direction from the motion previously completed.

Each signal from OR gate 44 also adds a count to a scan counter 52. A scans per run switch circuit or register 54 is preset to a number indicating the number of total scans desired. The switch circuit 54 and the scan counter 52 provide outputs to a concidence detector circuit 55, and when it detects completion of the desired number of scans, it provides an off signal which is suitably connected to stop the entire operation.

The output of the A to D circuit 25 preferably is fed through suitable formating circuits 58, which change the four digit BCD code from the converter 25 into a two byte, four digit BCD code (four bits per digit), which is recorded in an incremental tape recorder 60. A typical such recorder has the capability of recording in incremental fashion 2,000 characters per second. Use of this type of recorder eliminates the need for buffers between the output of the analyzing circuits and the recorder. However, it is possible to record blocks of data using appropriate buffers.

It should be noted that a stable drive signal (60 Hz) is provided to the *x* scan motor 12, and is locked to the rate of sample pulse controlling the A to D circuit 25 since both of them are driven from the crystal control oscillator 35. The output of the scanning and analyzing part of the system is thus a magnetic tape recording in digital code form representing incremental density variations in the scanned original.

The information on the tape is in the form of a succession of digital code words which are arranged in sequence according to the direction of the scan. The code words thus are in the same positional correlation as the increments scanned from the original. In other words, the scanning device, due to the clocked control of its output, effectively views in succession adjacent increments on the original, and he code words representing the density of these increments are placed on the tape in the same order. As is common with data recording systems, the recorded information is separated into blocks, and in the present system each block is conveniently arranged to contain the code words for one entire scan line. Therefore, successive blocks contain the code word information for successive scan lines, in the proper order. Because of this relationship between code words within the block of information representing one scan line, and because of the succeeding relationship of the blocks representing successive scan lines, each code word can be said to be in positional correlation in the recorded data according to the corresponding elemental areas scanned by the scanning device.

This information is next manipulated in an electronic computer, which produces a nine track (one track parity) output tape representing each increment of the pattern on the original in a $3 \times 3$ format, thus providing ten density values corresponding to how many of the nine possible points in the grid are blackened in the resulting print-out. Other matrix formats are possible, such as $4 \times 4$, $4 \times 5$, $5 \times 5$.

Figure 3:
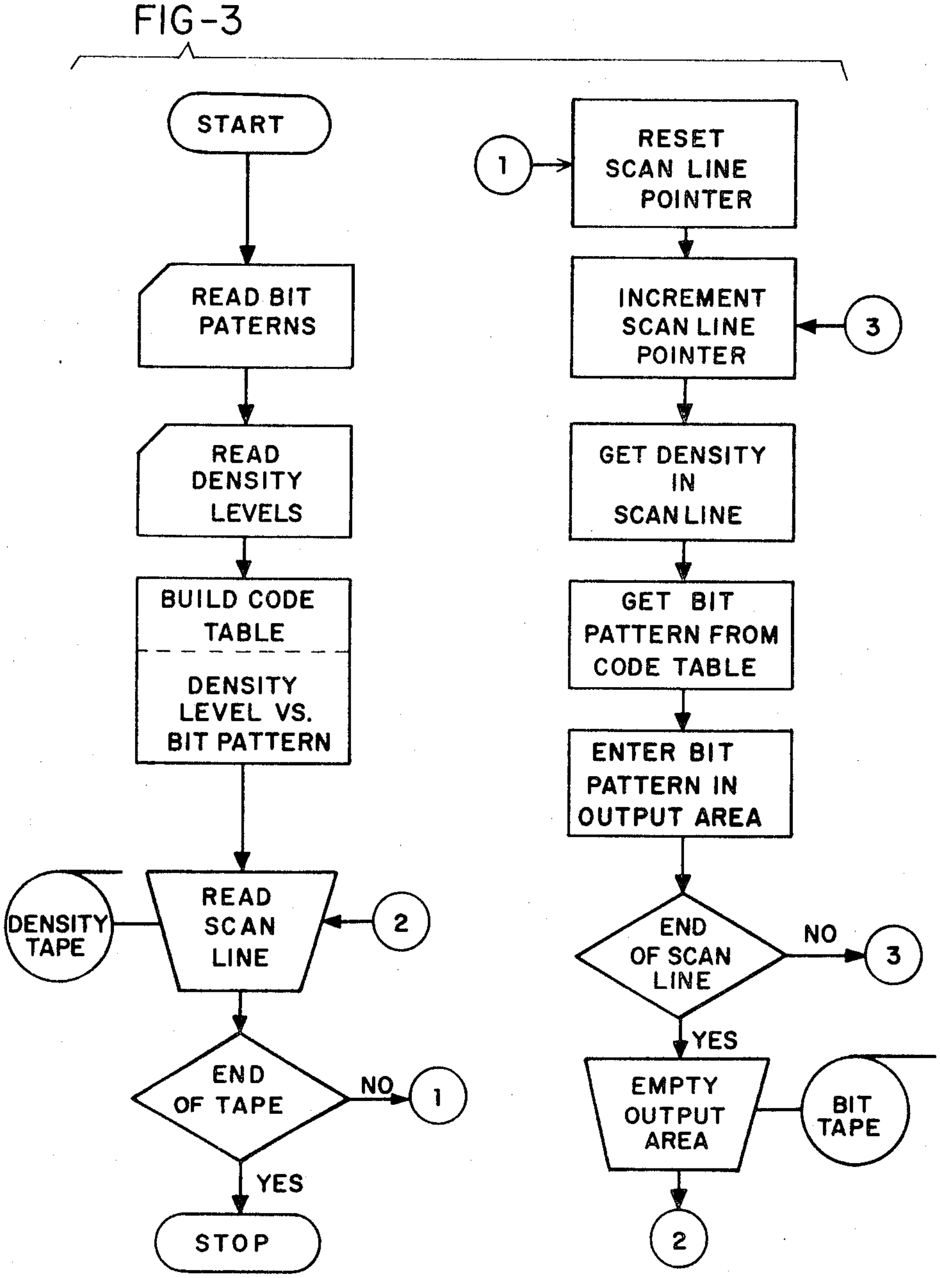
FIG. 3 is a flow chart of the program for manipulating the recorded information and producing a control tape for the printer.

The flow chart of the computer program, using conventional symbols for this type of chart, is shown in FIG. 3.

The first instruction of the program is an input which determines the format of the pattern in the output matrix, i.e., which combinations of dots in the matrix will be used to provide a graded output. For example, in a $3 \times 3$ matrix, one dot in the center may represent the lightest shade of gray, and all nine dots may represent black, with combinations in between providing a gray scale up to zero or no dots. This is shown in the flow diagram by the legend "Read Bit Patterns".

Next the instruction is introduced designating the scaling of the codes on the input tape. This is illustrated by the legend "Read Density Levels".

From these instructions the computer builds a conversion table for rapid determination of the individual matrix patterns in their density scale corresponding to input codes in their density scale. This allows direct determination of the appropriately scaled output matrix code from reading of an input two-byte density code. The step of creating this table is designated "-Build Code Table".

The computer then commences to read one line of input information from the input tape. As each two-byte code is read, its corresponding matrix pattern is found from the table previously built up. These steps are shown in the right-hand part of the diagram, and include setting an indicator which follows the processing of information for a single scan line. The matrix codes are entered in a storage output (core memory or disc or drum memory) as bits in the three parallel code positions. These output codes continue to be stored in sequence for a full scan line. As each two-byte input code is read and its corresponding matrix code is stored, the scan line indicator or pointer is incremented, as shown in the flow diagram, item 3.

Since in the described embodiment the information is to be used in a serial print-out system, information on a dot-for-dot basis is placed on the output tape by unloading from the three parallel storage positions, in sequence, for the entire line. This step is indicated by the legend "Empty Output Area". In the system described, the output is onto a tape having eight data channels, pulse one parity channel, thus one byte on the output tape may represent all of the information for the first third of two matrices, plus two dot positions of the first third of another matrix, etc.

Once the output storage is thus emptied, the program (Item 3) instructs the reading and look-up for the next line of information from the input tape, and this proceeds until the last line of input information is processed. The program continues until all information from the input tape is read and processed, then the program stops.

Recalling that in the original scanning mode described in connection with FIG. 1, the scanning action was back and forth, the input density tape will have every other scan line information recorded in opposite direction. It will be appreciated from the following description of a suitable print-out device that it may be desirable to have all output data in the same scanning sense. This can readily be accomplished by unloading backward every other line from the computer output storage, thus producing a continuous direct reading output tape.

In connection with the density levels assigned to the input codes, these can be calculated or otherwise determined in advance, knowing the density gradation of the original representation 18. It is also possible to determine the density levels by reading in advance all or a designated sample portion of the input tape, and statistically preparing a chart giving the range of density codes actually appearing on the density tape. This information is then used to assign density values to the input codes for purposes of building the code table.

Figure 4:
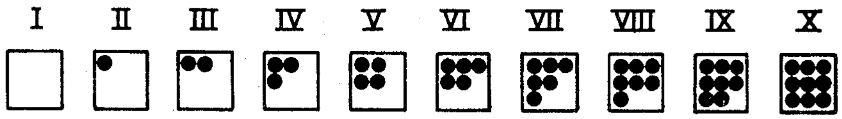
FIG. 4 is a diagram showing matrix tone variations.

By way of example, FIG. 4 illustrates the manner in which a 3 × 3 matrix can be employed to obtain tonal variation from white (block I) to essentially black (block X). For purposes of illustrating, the dots in the matrices have been substantially enlarged, having a diameter in the order of one tenth of an inch. In actual practice the dots might average, for example, approximately 0.004 to 0.005 inch diameter. Hence, in actual practice the width and height of an actual matrix can be in the order of 0.012 to 0.015 inch. In regions where the density level is low, tending from light gray to white, the matrices will be reproduced to have none or only a few drops within a predetermined matrix.

It should be understood that the marks may be designed to overlap, rather than merely be adjacent as in block X, and a more complex matrix may be used to obtain a greater density scale, for example matrices may be employed having cells arranged 4 × 4, 4 × 5, 5 × 5, etc. With closer spacing of the centers of the marks, these matrices can be arranged to occupy little or no great space and the dimensions previously given. The visual effect obtained from this matrix construction is directly comparable to the effect obtained by half tone screening. Those areas where more marks occupy cells of one or more matrices will appear more dense or darker, and vice versa. Reproduction of an entire image in this manner results in an image having the same visual effect as a half tone print, with a definite scale of half tones from white to black.

In fact, by manipulation of correspondence between input codes and the actual matrix codes used for marking, it is possible to enhance or de-emphasize contrast as may be desired in a particular operation. For example, a photographic negative having poor contrast may be operated upon according to the invention to produce a print which has substantially greater contrast than is available from a print made by ordinary photographic means from the original negative.

It should be understood also that the invention is applicable to processing of sets of prints, such as color separations normally used in the production of multicolor printing plates. By employing the matrix arrangement, it is possible to reproduce color separations, enhance contrast of one or more of them if needed, and actually to produce a multi-color print by precisely overprinting with different colors. The control available from the digital signals makes it possible to obtain accurate registration of the various colors and to produce a high quality print. By the same token, it is possible to store the digital information corresponding to individual color separations, actually to transmit this information if desired, and eventually to use this information in reconstructing separate color separations or color printing plates which can then be used in conventional multi-color printing processes.

Figure 5:
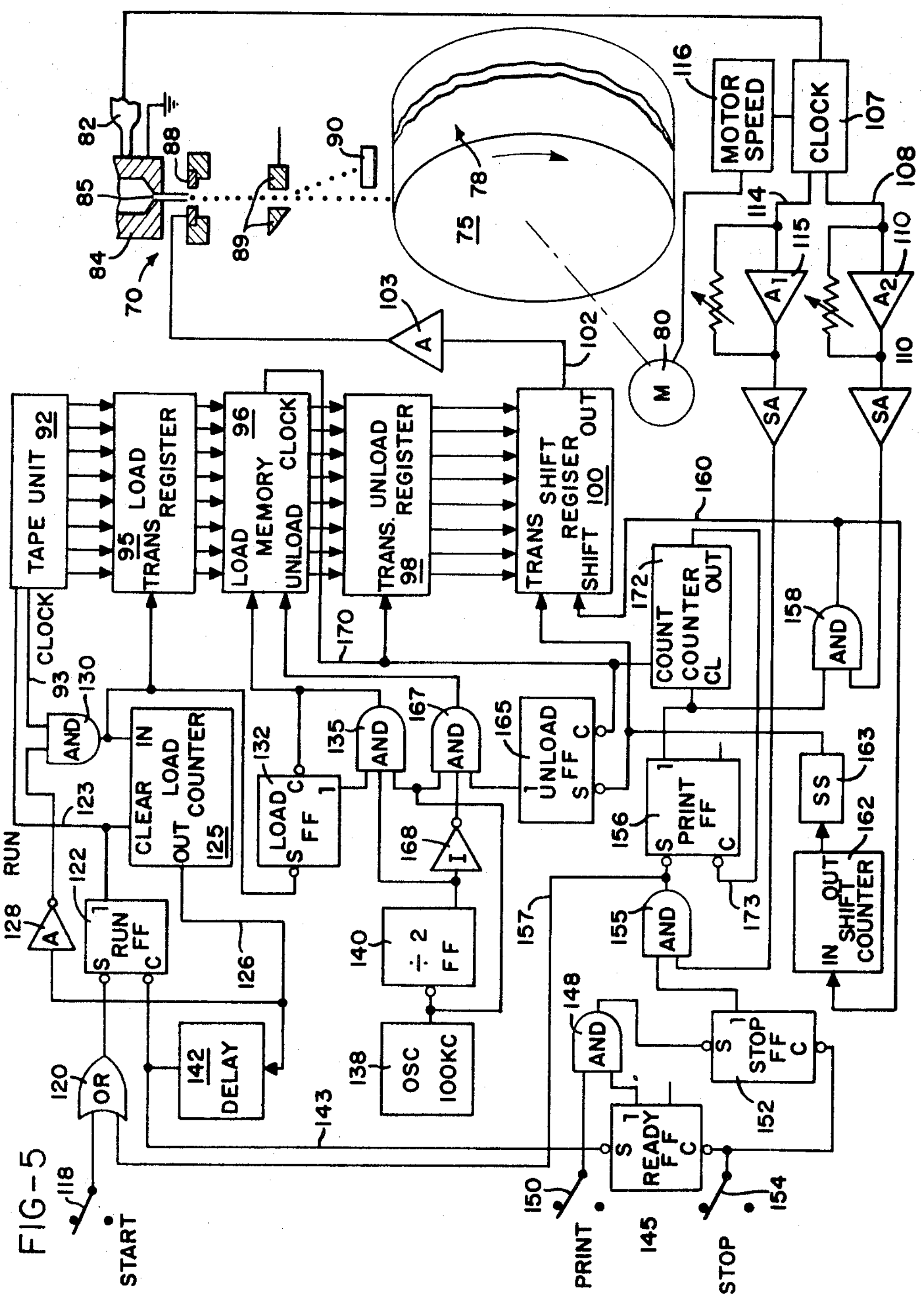
FIG. 5 is a block diagram of the printer and associated buffer and controls.

In FIG. 5, a preferred embodiment of print-out device embodies an ink or marking drop generator 70 positioned over the surface of a rotating cylinder 75 carrying a receiving member 78, such as a paper sheet, on its surface. This structure is in turn mounted upon a slide (not shown) which is moved through connections between a nut carried on a slide and a helically threaded cross shaft. Details are described in copending application Ser. No. 768,763, filed Oct. 18, 1968, now U. S. Pat. No. 3,588,906, issued June 28, 1971.

The drop generator is arranged to create individual drops of a marking substance, such as an ink, by selectively electrostatically charging and deflecting certain of the drops. For example, assuming that the rotational movement of cylinder 75 causes an "$x$" relative scanning movement between the paper 78 and the drop generator, if every drop were permitted to proceed to where it deposited on the paper, that drop would create a dot or mark of about 0.005 inch diameter in a cell or sub-area of a predetermined matrix. A complete continuity of drops would create a solid "line" of three drops across the various rows of cells of each adjacent matrix. In the system shown, and described hereafter, three horizontal scans are required to complete the creation of one horizontal row of matrices. If one row, for example, were to embody matrices all on the gray scale corresponding to FIG. 4, block IV, in the first scan for every matrix two drops would be deposited, then one drop would be prevented from depositing, and so on through the remainder of the line scan. Then, in the next line scan for each matrix one drop would deposit, two would be prevented from depositing, and so on through the remainder of that line scan. Finally, during the third line scan no drops would be deposited. The result would be the creation of one complete horizontal row of matrices each having three dots placed in the positions shown in FIG. 4, block IV.

The drive means 80 is connected to rotate cylinder 75 at a predetermined speed and to rotate cross shaft at a predetermined substantially slower speed. One rotation of the cylinder can correspond to one "$x$" scan. Thus in a 3 × 3 matrix scheme, three revolutions will cover the same relative print area as one scan of the original in the apparatus shown in FIG. 1. Rotation of the drum 75 may be related to the frequency of drop generation, which is controlled by a vibrating stimulator 82. The correlation between movement of the receiving member 78 and drop generation rate is such that the dots formed on the receiving member by successive drops will preferably be in adjoining relation (see FIG. 4, block X). The rotation of the cross shaft is such that during one complete revolution of the cylinder, movement of the drop generator longitudinally of the cylinder will occur through a distance equal to the desired center-to-center dot separation distance. In other words, the drop generator is caused to scan in a shallow helical path over the surface of the cylinder 75 and the receiving member 78 carried thereon. The cross shaft movement can also be intermittent and rapid, once for each cylinder revolution, as by a stepping motor drive, to cause spaced circular scans.

Details of the drop generator include an ink supply tube 84 having a discharge orifice 85 aligned to direct drops of liquid ink along a path or trajectory which extends toward the receiving member. Ink under pressure is supplied to tube 84 from a suitable source (not shown) and the stream of liquid ink issuing from the orifice breaks into a series of drops. The nose of the stimulator 82 engages tube 84, and the resulting vibration, in the order of 40 KHz, causes drops of essentially equal size to be formed at precisely spaced intervals.

Control over the individual drops is exercised through an electrostatic charging and deflecting system. A charge ring 88 surrounds the path of the jet immediately below the orifice 85, at or near the point where drops break away from the stream of liquid emerging from the orifice. By selectively imposing a potential difference between the ring 88 and tube 84, a charge status can be imparted to selected drops. Below the charge ring is a set of electrodes 89 across which a substantial potential difference (e.g., in the order of 1KV) is applied to create a deflection field.

Uncharged drops continue along the normal trajectory and impact on the receiving member in a predetermined cell within a predetermined matrix, while charged drops are switched by the field into a catcher 90 and thus removed from the system. By correlating drop switching with the movement of the receiving member, it is thus possible to locate each drop deposited on the member 78 according to a coordinate position or cell in a matrix. Precise placement of many small drops thus permits the construction of high quality images on the receiving member.

Referring to FIG. 5, the print-out device includes a typical magnetic tape reader unit 92, into which the output code tape is loaded. The tape unit reconstitutes a clock signal which controls the output of information and provides a clock signal on line 93, and suitable controls are also incorporated in the unit for starting, stopping and advancing, all of these controls being conventional and well known in the art. The tape unit 92 is connected to unload information, a byte at a time, into a first or loading register 95, which in turn is connected to load information one byte at a time into a suitable information matrix memory 96, such as a typical core matrix memory. In one embodiment of the invention the memory 96 is divided into two units, each capable of storing 1,024 eight bit bytes of information. The memory output is connected to an unloading register 98 which handles output information from the memory one byte at a time and is connected to pass this information on in the same fashion to an output shift register 100. This shift register has a serial output line 102 connected through an amplifier 103 (and other suitable pulse shaping circuits which are not shown for purposes of simplification) to the charging ring 88 of the ink or marking drop generating unit. The information unloaded into the shift register 100 thus is transmitted through line 102 as individual bits in the proper sequence, constituting the marking matrix information.

The registers and the memory thus serve as a buffer capable of receiving and storing the information, and passing it on to the drop generating unit as directions for locating a given dot on the surface of the receiving member 78 carried on the rotating drum 75. For purposes of this invention, the surface of the receiving member can be considered to be divided in matrix fashion, with the individual scan lines followed by the drop generator 70 being one portion (i.e., the $x$ scan) of the matrix, and the opposite portion (the $y$ scan) of the matrix is formed through a synchronous drive for the cylinder 75 and the output or unloading control of the memory. A series of pulses are generated by a master clock or pulse generator 107 and these are transmitted as "mark" control pulses over line 108 onto an input amplifier 110. For control purposes the clock also provides a separate synchronizing pulse, one for each revolution of drum 75, over line 114 to amplifier 115, and hence into the system. The clock also provides a synchronizing output which regulates a motor speed control 116 that in turn controls the speed of motor 80.

To initiate operation of the buffer, closing of the manual start switch 118 will produce an output from OR gate 120 to set the running control flip-flop 122, thus producing a set output from this flip-flop which is connected to signal the tape unit 92 over line 123, and hence initiate reading of information from the tape reading unit. The output from flip-flop 122 also provides an input to a load control counter 125 to clear that counter and prepare it for a loading operation. With the counter cleared, its output line 126 is at a low logic level, and this results in a high level logic signal from the inverting amplifier 128 to the load control AND gate 130. This enables the AND gate 130 and clock pulses over line 93 from the tape unit 92 are transmitted by AND gate 130 to the counter 125, and are subsequently accumulated in this counter until the counter fills. The counter 125 has a capacity of one half of the memory 96. The output from AND gate 130 also is transmitted to the load register 95 as a transfer input signal, and further is connected to the set input of the memory load control flip-flop 132.

A load control AND gate 135 receives an enabling signal each time the load flip-flop 132 is set, and this AND gate has two additional inputs, one coming directly from the output of a 100 KHz oscillator 138, and the other coming from the output of a dividing flip-flop 140. Therefore, the AND gate 135 is enabled on every other output from the oscillator 138, provided the load flip-flop 132 is set, this arrangement forming a pulse generator means controlling the loading. An output from AND gate 135 produces a load signal to the memory 96, and a reset signal to the load flip-flop 132, thus immediately inhibiting AND gate 135. This circuit therefore permits the loading, one byte at a time, of information from register 95 into memory 96. So long as the run control flip-flop 122 remains in its set condition, this sequence repeats and the tape unit unloads the position control information into the register 95, from whence the information is transferred into the memory 96.

When the load counter 125 is full, a high level output on line 126 results in a low level output from the inverter 128, inhibiting the AND gate 130 and terminating the transfer pulses to register 95. Further, line 126 is connected through a delay circuit 142 to the clear or reset input of flip-flop 122, thus removing the run signal from line 123 and stopping the tape unit. The output from the delay circuit also is transmitted over line 143 to the set input of a further control flip-flop 145 which indicates that the buffer is ready for a printing operation.

The set output of flip-flop 145 enables an AND gate 148, and the other input to this AND gate is from a manually operated switch control 150. To initiate the first printing operation this switch is closed, thus enabling AND gate 148 which in turn provides a set signal to the stop control flip-flop 152. If at any time it is desired to stop the printing operation, the manually operated stop switch 154 can be operated to provide clear or reset signals to flip-flops 145 and 152. The set output of flip-flop 152 provides an enabling circuit to a print control AND gate 155. The second input to this AND gate is through amplifier 115 from the clock 107. When this signal is received the resulting output from AND gate 155 provides a set input to the print control flip-flop 156, and also provides a signal over line 157 to the OR gate 120, to again set the run control flip-flop 122, since it is now possible to commence a loading operation from the tape unit, with the printer beginning to use information from the memory 96.

It should be understood that on starting, the start switch 118 may be operated to initiate a further loading operation after the load control counter 125 has terminated loading of the first 1,024 bytes. This is due to the fact that the memory actually has twice this capacity, and can be fully loaded at the start, then unloading will proceed from one half of the memory while loading can similarly occur in the other half of the memory with the information being transferred internally from input to output of the memory. With the print flip-flop set, its output provides an enabling signal to the mark control AND gate 158. The other input to this AND gate is from amplifier 110 and the mark pulse generating system of clock 107. The mark pulses are thus passed on through the output of AND gate 158, via line 160, to the shift input of the shift register 100. Assuming for the moment that a byte has been transferred into this shift register, the mark pulses will cause the individual bits to be transmitted as control pulses on the output line 102, and this will result in charging, or not charging, of the individual drops depending upon the status of the individual bits or digital signals.

Line 160 also is connected to the input of a shift control counter 162 which has a capacity of eight bits, in other words the information in one byte. Once this counter fills it sends an output to a single shot multivibrator circuit 163, which in turn transmits a signal to the set input of an unload control flip-flop 165, and also transmits a transfer pulse to the shift register 100, enabling it to receive the next byte from the unload register 98. The set output of flip-flop 165 is connected to one of the three inputs of the unload control AND gate 167. The other inputs to this AND gate come from the oscillator 138 and from the dividing flip-flop 140 through an inverter 168. Because of the inverter circuit, the pulses on which AND gate 167 is enabled are the opposite pulses from those on which AND gate 135 is enabled. In this manner the loading and unloading of the memory is interlaced, each occurring in this example at a maximum rate of 50 KHz.

There is an unload clock signal from memory 96, transmitted on line 170, which goes to the transfer input of the unload register 98, to the reset or clear input of the unload control flip-flop 165, and as a count to the unload counter 172. This counter is cleared each time there is a set output from the print flip-flop 156, which also enables the AND gate 158. Unloading from the memory into register 98 will continue as the register is available to receive additional bytes of information, and each transfer of one byte will add another count into the unload counter 172, which has a capacity of 1,024. When this counter fills, it produces an output on line 173 to the clear or reset input of print control flip-flop 156, resulting in an inhibiting signal to the AND gate 158 and thereby preventing further shift pulses to the shift register until the next synchronizing signal over line 114 which will again cause AND gate 155 to set the print flip-flop 156 and being operation on the next scan over the receiving member.

This assures that each printing operation beings in a new scan at the same location, and assures proper alignment of successive "lines" of dots produced by successive scans of the receiving member past the drop projector. It will be appreciated that the clock control 107, which in turn controls the unload register, the shift register, and the drive, provides for unloading the buffer in exact positional correlation to the intended coordinate location of the marks or dots to be placed on the receiving member. Each mark pulse over line 108 functions to gate a corresponding bit of information from the shift register, and depending upon the nature of this bit, the corresponding drop will pass to the receiving member, or will be deflected and removed from the drop trajectory thereby not placing a mark within a designated matrix cell on the receiving member. Centering of the aforesaid mark within its assigned matrix cell is accomplished by driving stimulator 82 in synchronism with the mark pulses. Using drops of the size previously mentioned, it is possible to construct images in full or half tone with great precision, and to reconstruct such images repeatedly as may be desired. Using this same technique repeatedly with different colors of ink, it is possible to produce multi-color prints, with each matrix and its cells precisely overlayed on the previously formed portion of the image, matrix for matrix.

From the foregoing explanation, and recalling the manner in which the matrix dot information is placed on the tape used to control the printing unit, it would be seen that three (or more) revolutions of the cylinder 75 are required to complete all of the corresponding 3 × 3 (or 4 × 4, 4 × 5, etc.) dot matrices corresponding to a single input scan line. In the arrangement illustrated, this provides an enlarged reproduction of the original representation 18 (FIG. 1), and by manipulation of the data used to control the bit pattern vs. density code table, it is possible to enhance the contrast of the image during the image reconstruction process heretofore described. The arrangement employing a single drop generator unit has been found most practical from the standpoint of mechanical simplicity, however it should be understood that it is possible to construct drop generator units in multiples, for example such that there would be as many units as there are positions in that direction across the matrix transverse to the scanning motion. Thus the matrix information in the output tape can be stored in multiple channels and unloaded in a similar manner to control individual drop generators and switching controls to create drop in corresponding positions in the matrix. Furthermore, it should be recognized that there is no limit on the number of images that can be recreated in this manner, and by using spaced multiples of the jet drop marking units, it is possible to generate multiple images simultaneously. Also, by controlling the polarity of the signals directed to the charge ring of the drop generating unit, it is possible to reverse the image and thus create a negative or positive as may be desired.

While the apparatus herein described constitutes a preferred embodiment of the invention, it is to be understood that the invention is not limited to this precise form of apparatus, and that changes may be made in either without departing from the scope of the invention.

What is claimed is:

1. In apparatus for the precise placement of liquid drops on a receiving surface, said apparatus including
   - a source of positionally correlating information defining the location of dots making up the image,
   - means for generating and projecting a stream of separate uniformly sized drops of liquid along a predetermined initial trajectory,
   - stimulating means operating on said drop generating means to cause uniform drop size and spacing between successive drops,
   - charging means located along the drop path and constructed and arranged to apply an electrostatic charge selectively to the individual drops,
   - means providing a deflection field along the drop path downstream of said charging means, for deflecting charged drops into a different trajectory,
   - means supporting a receiving surface intersecting one of said trajectories,
   - means for interrupting drops following the other trajectory, and
   - drive means producing relative movement between said drop generating means and said supporting means; the improvement comprising
   - clock means generating pulses at a rate corresponding to the desired size and spacing of drops,
   - means connecting said clock means to control said stimulating means and said drive means,
   - a memory receiving and storing said positionally correlated information from said source,
   - said memory having an output control also connected to said clock means for unloading information synchronously with drop generation, and
   - a connection from said output control to said charging means for producing an accurately registered image on said receiving member.

2. Apparatus as defined in claim 1, wherein said means for supporting the receiving surface is a rotatable drum driven by said drive means, and said drive means also includes means for moving said drop generating means longitudinally of said drum to direct drops toward all possible dot locations in the image area of the receiving means.

3. Apparatus as defined in claim 1, wherein said source of information is a magnetic storage in which the dot locations for an image are retained,
   - said memory having a capacity to store only a part of the information for the entire image,
   - and said output control including register means arranged to unload information from said memory and to supply the information serially to said charging means.

4. Apparatus as defined in claim 3, including pulse generator means and an associated control circuit constructed and arranged to unload information from said magnetic storage into said memory at a rate sufficient to maintain a continuing supply of information to said output control as it transmits information serially to said charging means.

5. Apparatus for the precise placement of liquid drops on a receiving surface to form an image, comprising
   - a source of positionally correlated information defining the location of dots making up the image,
   - means for generating and projecting a stream of separate uniformly sized drops of liquid along a predetermined trajectory, stimulating means operating on said drop generating means to cause uniform predetermined spacing between successive drops, charging means located along the drop path and constructed and arranged to apply an electrostatic charge selectively to any individual drop, means providing a constant deflection field along the drop path downstream of said charging means, means supporting a receiving surface intersecting said trajectory, means for preventing the deflected drops from depositing on the receiving surface, drive means including a motor producing movement of said supporting means past said drop generating means at a constant rate, a buffer receiving and storing said positionally correlated information from said source, a clock controlling the speed of said motor, generating marking pulses for gating the output of information from the buffer in positional correlation with the movement of the receiving surface, and driving the stimulator in synchronism with said marking pulses, and, an output connection from said buffer to said charging means for producing an image on said receiving member having correct register in the direction of said relative movement.

* * * * *